United States Patent [19]

Inagaki et al.

[11] Patent Number: 4,753,416
[45] Date of Patent: Jun. 28, 1988

[54] ARTICLE OBTAINED BY INJECTION MOLDING

[75] Inventors: Akio Inagaki, Okazaki; Kiyotaka Nakai, Chita; Kenji Yogo, Nagoya, all of Japan

[73] Assignee: Aisin Seiki Kabushiki Kaisha, Kariya, Japan

[21] Appl. No.: 18,449

[22] Filed: Feb. 25, 1987

[30] Foreign Application Priority Data

Feb. 25, 1986 [JP] Japan ................... 61-026059

[51] Int. Cl.⁴ .................. F16K 31/06; F16K 27/00
[52] U.S. Cl. .................... 251/129.15; 137/625.65; 251/366
[58] Field of Search ............. 251/129.15, 366, 625.65

[56] References Cited

U.S. PATENT DOCUMENTS 4,074,700  2/1978  Engle ................... 251/129.15 X
4,561,469  12/1985  Akagi .................. 251/129.15 X Primary Examiner—Arnold Rosenthal
Attorney, Agent, or Firm—Oblon, Fisher, Spivak, McClelland & Maier

[57] ABSTRACT

An article, obtained by injection molding, includes a first member on which an electrical element such as a coil is provided or mounted and a second member, surrounding the first member, formed integrally therewith. A first radially inward projection of the second member is in abutment with a first annular flange of the first member. A second radially inward projection of the second member is fitted in and welded to a vee on the first annular flange. Such weld acts as a seal for water-proofing the electric element. For preventing separation of weld due to repetition of radial expansion of electrical element upon current application thereto, a connecting means is provided between the first radially inward projection and the first annular flange.

3 Claims, 2 Drawing Sheets

ARTICLE OBTAINED BY INJECTION MOLDING

BACKGROUND OF THE INVENTION

1. Field of the Invention

The present invention relates to an article obtained by injection molding.

2. Description of the Prior Art

Japanese Patent Application, which is laid open as No. 60-155074 under the date of Aug. 14, 1985, discloses a solenoid-operated valve in which an article of the type is employed as a casing. The article includes a first member on which a coil is wound and a second member surrounding the first member. For obtaining such article, injection molding is employed. That is to say, previously prepared first member is placed in a mold and then molten material is supplied thereinto for forming the second member. The second member is welded to the first member at a portion near the coil during aforementioned molding. Resulting weld acts as a seal means for water-prooving the coil.

However, the portion at which weld is applied is so relatively small in area due to request for miniturization of the casing or article that seal function is decreased or weaken.

SUMMARY OF THE INVENTION

It is, therefore, an object of the present invention to provide an article obtained by injection molding without aforementioned drawback.

DESCRIPTION OF THE PREFERRED EMBODIMENT

Figure 1:
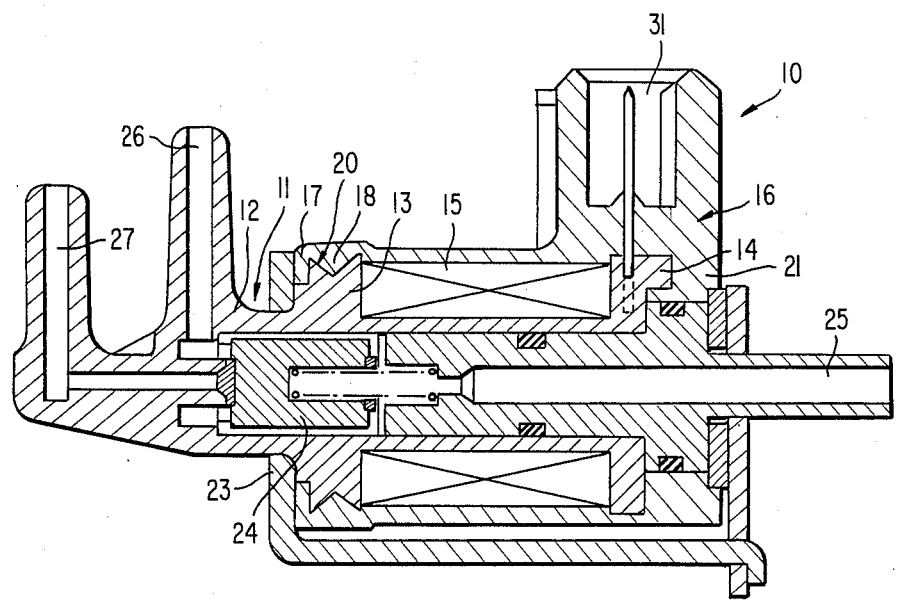
FIG. 1 is a cross-sectional view of a solenoid-operated valve including an article obtained by injection molding.

Referring now to FIG. 1, a solenoid-operated valve 10 includes a first member or an inner bobbin 11. The first member 11 has a main body 12 and a set of axially spaced annular flanges 13 and 14 each of which is projected radially inwardly from the main body 11. The annular flange 13 and the annular flange 14 are defined respectively as a first annular flange and a second annular flange. A coil 15 is wound on the main body 12 between the flanges 13 and 14. A second member or an outer bobbin 15 surrounds the fitst member 11 and the coil 15. The second member 16 has a first radially inward projection 17, a second radially inward projection 18 in the form of emarginated configuration engaged or fitted in a vee 20 on the first annular flange 13, and a third radially inward projection 21 engaged with the second annular flange 14.

The first member 11 wih the coil 15 and the second member 16 constitute an article. That is to say, the first member 11 with the coil 15 is previously prepared and is placed in a mold (not shown) as an insert member. Thereafter, a quantity of molten material such as nylon or plastics is supplied or fed into the mold for forming the second member 16. During this injection molding, the second radially inward projection 18 is welded to the vee 20 on the first annular flange 13.

Figure 2:
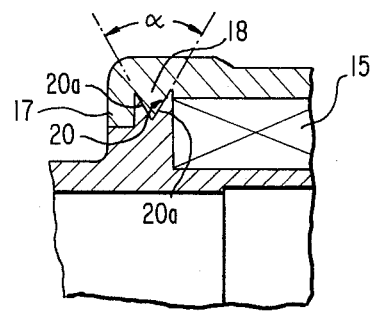
FIG. 2 is a view for showing an improved construction of a welded portion between two members of an article.

Weld between the second radially inward projection 18 and the vee 20 acts as a first sel means for water-prooving the coil 15. For assurance or increase sealing function at this weld, an angle between two adjacent surfaces 20a and 20a of the vee 20 is set to acute as shown in FIG. 2. For prevention of water-invasion between the third radially projection 21 and the second annular flange 14, a second seal means in the form of O-ring 40 is employed. The O-ring 40 is provided on an inner body 41 fitted in the first member 11.

Upon energization of the coil 15, a yoke 23 and a movable member 24 constitute a magnetic circuit, with the result in rightward displacement of the movable member 24. Thus, communication between a passage 25 and a passage 26 is interrupted and simultaneously communication between the passage 25 and a passage 27 is established.

Figure 3:
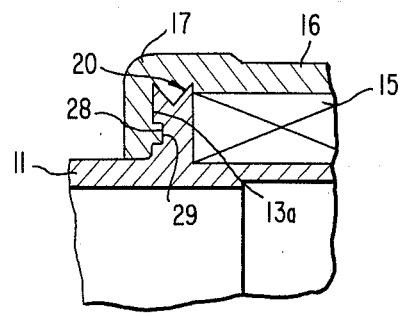
FIG. 3 is a cross-sectional view showing a connecting means.
Figure 4:
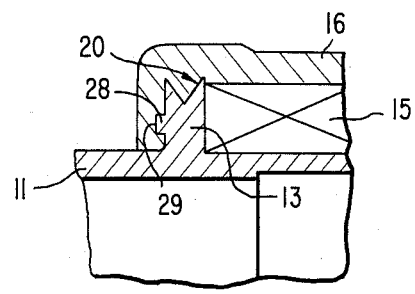
FIG. 4 is a view showing an alternate construction of a connecting means.

In FIG. 3, a projection 28 is formed integrally to an inside surface 17a of the first radially inward projection 17 of the second member 16 and is fitted in a concaved portion 29 formed at an outside surface 13a of the annular flange 13. During formation of the second member 16 around the first member 11 in the mold, the projection 28 and the concaved portion 29 are weled with each other. Thus, connection between the projection 28 and the concaved portion 29 serves to prevent separation thereat in spite of repetition of radial expansion of the coil 15. The projection 28 and the concaved portion 29 may be replaced with each other as shown in FIG. 4. In addition to the projection 28 and concaved portion 29 corresponding thereto, one or more projections and concaved portions (not shown) are provided, respectively, in the circumferential direction of the outer surface of the first annlar flange 13.

The first member 11 is made from Nyron-6 including nittle rubber 5 wt. % and glass fiber 30 wt. %, and raw material of the second member 16 is Nyronn-66 including glass fiber 30 wt. %.

Upon injection molding, temperature of cylinder (not shown) is kept at 280° C., temparature of the mold is kept at 60° C., and guage pressure is set at 35 Kg/cm².

For confirmation of connecting effect between the projection 28 and the concaved portion 29, an experiment is performed in the following manner.

Figure 5:
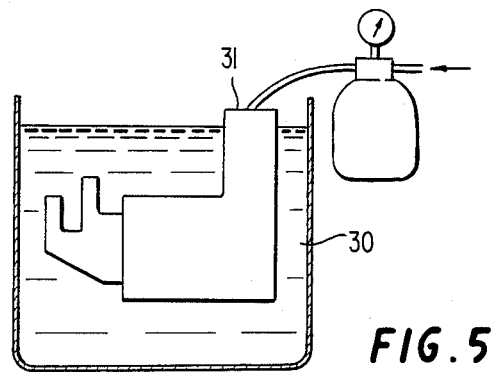
FIG. 5 is a view showing how to check seal function of a welded portion of an article.

(1) Valves of type-A, type-B and Type-C are prepered. Each valve of type-A, type-B and type-C, respectively, includes a construction shown in FIG. 4, FIG. 5 and FIG. 2.

(2) Previously prepared valves of aforementioned 3-types are brought into immersion in water 30 in sequence or one by one and then air under compression at 1 Kg/cm² is being supplied to an connecting portion 31 of the valve 10 10 minutes, so as to check whether the welded portion has seal ability or not.

(3) Each valve 10, which has passed the check as described in item (2), is transfered from a first condition at which the valve 10 is set under −40° C. atmosphere 1 hour to a second condition at which the valve 10 is set 120° C. and the coil 15 is applied with 14V current 1 hour. Such transfer is repeated 100 times as to 5 valves per each type. After repetition of such transfer, it is prooved that all valves of type-C are brought into malfunction of seal ability at welded portion between the first and second members. On the contrary, all valves as to type-A and type-B, remained seal ability at the welded portion.

What is claimed is:

1. An article obtained by injection molding comprising, a first member having a main body, a first annular flange projected from said main body in the radial direction thereof and a second annular flange projected from said main body in the radial direction thereof and spaced from said first annular flange in the axial direction of said main body;

an electrical element to be water-prooved provided between said annular flanges on said main body of said first member;

a second member surrounding said first member and said electrical element, said second member having a first radially inward projection abutted to an outside surface of said first annular flange, a second radially inward projection in the form of emarginated configuration engaged in a vee formed circumferentially on said first annular flange and a third radially inward projection engaged with said second annular flange;

seal means between said second radially inwardly projection and said vee in the form of weld applied during injection molding wherein said first member is being placed in a mold as an insert member and molten material is being supplied into said mold for forming said second member; and connecting means for preventing radially outward movement of said second member relative to said first member.

2. An article in accordance with claim 1 wherein said connecting means is in the form of tongue-and-groove joint provided between an inside surface of said first radially inward projection of said second member and said outside surface of said first annular flange of said first member.

3. An article in accordance with claim 2 wherein one or more projections are provided to said inside surface of said first radially inward projection and one or more concaved portions corresponding thereto are formed at said outside surface of said first annular flange.

* * * * *

UNITED STATES PATENT AND TRADEMARK OFFICE
CERTIFICATE OF CORRECTION

PATENT NO. : 4,753,416

DATED : June 28, 1988

INVENTOR(S) : Akio Inagaki, et al.

It is certified that error appears in the above-identified patent and that said Letters Patent is hereby corrected as shown below:

In column 1, line 21, delete "water-prooving" and insert therefor --waterproofing--;

In column 1, line 23, delete "miniturization" and insert therefor --miniaturization--;

In column 1, line 25, delete "weaken" and insert therefor --weakened--;

In column 1, line 57, delete "fitst" and insert therefor --first--;

In column 2, line 5, delete "Weld" and insert therefor --The weld--;

In column 2, line 6, delete "sel" and insert therefor --seal--;

In column 2, lines 6 and 7, delete "water-prooving" and insert therefor --waterproofing--;

UNITED STATES PATENT AND TRADEMARK OFFICE
CERTIFICATE OF CORRECTION

PATENT NO. :  4,753,416

DATED     :  June 28, 1988

INVENTOR(S) :  Akio Inagaki, et al.

It is certified that error appears in the above-identified patent and that said Letters Patent is hereby corrected as shown below:

In column 2, line 7, delete "increase" and insert therefor --increased--;

In column 2, line 29, delete "weled" and insert therefor --welded--;

In column 2, line 39, delete "annlar" and insert therefor --annular--;

In column 2, line 42, delete "Nyronn-66" and insert therefor --Nyron-6--;

In column 2, lines 44 and 45, delete "temparature" and insert therefor --temperature--;

In column 2, line 46, delete "guage" and insert therefor --gauge--;

In column 2, line 50, delete "Type-C" and insert therefor --type-C--;

UNITED STATES PATENT AND TRADEMARK OFFICE
CERTIFICATE OF CORRECTION

PATENT NO. : 4,753,416

DATED : June 28, 1988

INVENTOR(S) : Akio Inagaki, et al.

It is certified that error appears in the above-identified patent and that said Letters Patent is hereby corrected as shown below:

In column 2, lines 50 and 51, delete "prepered" and insert therefor --prepared--;

In column 2, line 54, after "of" insert therefor --the--;

In column 2, line 55, delete "3-types" and insert therefor --three-types--;

In column 2, line 55, delete "brought into immersion" and insert therefor --immersed--;

In column 2, line 57, delete "being";

In column 2, line 59, delete "seal ability" and insert therefor --sealed--;

In column 2, line 61, delete "transfered" and insert therefor --transferred--;

In column 2, line 67, delete "prooved" and insert therefor --proved--;

UNITED STATES PATENT AND TRADEMARK OFFICE
CERTIFICATE OF CORRECTION

PATENT NO. : 4,753,416

DATED : June 28, 1988

INVENTOR(S) : Akio Inagaki, et al.

It is certified that error appears in the above-identified patent and that said Letters Patent is hereby corrected as shown below:

In column 3, line 2, delete "seal ability" and insert therefor --sealability--;

In column 3, line 14, delete "water-prooved" and insert therefor --waterproofed--.

Signed and Sealed this

Twenty-seventh Day of December, 1988

Attest:

DONALD J. QUIGG

*Attesting Officer*   *Commissioner of Patents and Trademarks*